July 7, 1964 L. A. LEECH 3,139,649
PRESSES FOR MOLDING OR FORMING CONCRETE AND OTHER
PLASTIC AND MOLDABLE MATERIALS
Filed Oct. 4, 1961 3 Sheets-Sheet 1

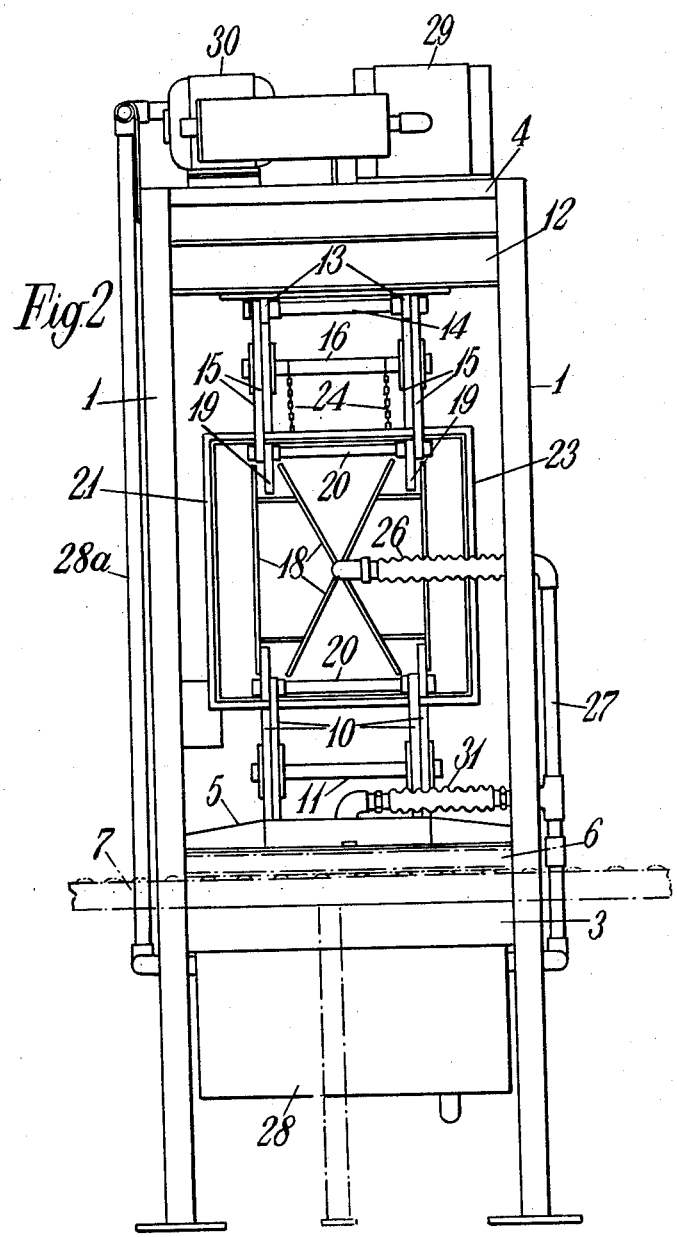

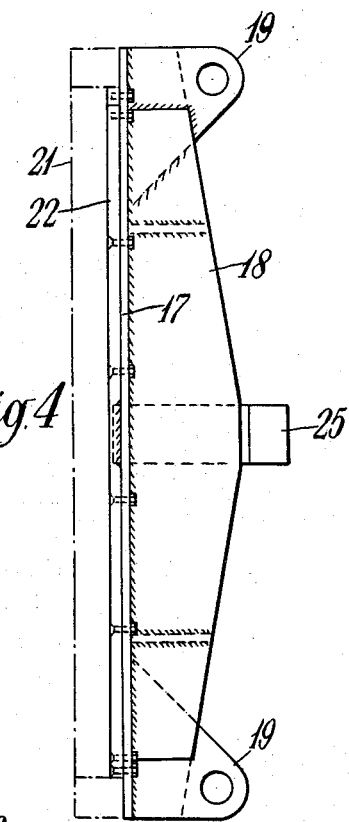
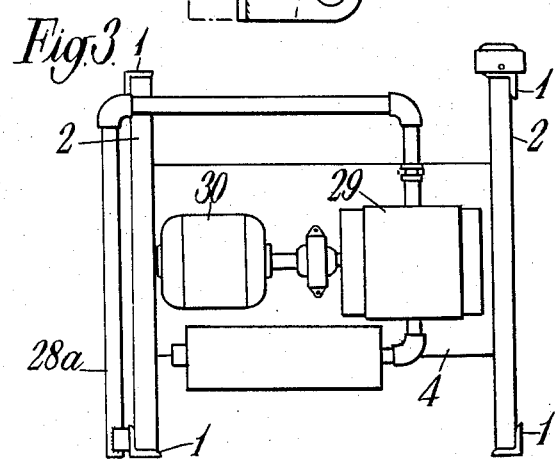

United States Patent Office 3,139,649
Patented July 7, 1964

3,139,649
PRESSES FOR MOLDING OR FORMING CONCRETE AND OTHER PLASTIC AND MOLDABLE MATERIALS
Laurence Arthur Leech, London, England, assignor to Millars' Machinery Company, Limited, London, England
Filed Oct. 4, 1961, Ser. No. 142,828
Claims priority, application Great Britain Oct. 26, 1960
5 Claims. (Cl. 18—16)

This invention relates to presses for molding and forming concrete and other plastic moldable materials and may be applied with particular advantage to presses which include means for the vacuum withdrawal of liquid from the material during the molding thereof, although not limited thereto. It is the main object of the invention to provide an improved press in which the molding pressure is applied by particularly simple and convenient means.

The invention consists in a press for molding or forming concrete or other plastic materials having a displaceable pressure element which is operatively connected to one or more relatively movable actuating members forming a closed chamber which can be evacuated to effect application of the pressure element to the mold.

In a preferred arrangement according to the invention the pressure element is suspended from an extensible linkage which includes as elements thereof two actuating means as referred to in the preceding paragraph arranged so that approach of said means under vacuum action extends the linkage. The actuating means may conveniently be of plate form disposed in parallel spaced relation and provided with marginal sealing means forming a closed chamber or chambers capable of being contracted by evacuation thereof to effect relative movement of the means. The marginal sealing means may conveniently comprise compressible and elastic sealing material.

In one preferred construction there are provided a pair of extensible linkage elements each comprising pivotally connected crossed links between which are pivotally connected a pair of actuating means forming the closed chamber or chambers, an upper cross link element being suspended from a fixed support and a lower crossed link element being pivotally connected to the vertically displaceable pressure element of the press, and means for applying suction to the closed chamber or chambers.

In one arrangement according to the invention, the displaceable pressure element for the mold is formed as a vacuum pad or mat through which liquid can be drawn by suction from the material in the mold, and including means for connecting said pad or mat to a source of suction. Conveniently the evacuation of the said pad or mat and of the chamber or chambers of the actuating members is effected from a common suction source of exhauster unit.

In the accompanying drawings,

FIGURE 2 is a side elevation of the press of FIGURE 1;

FIGURE 3 is a plan view of the upper part of the press;

FIGURE 4 is a side elevation of one of the pressure plates of FIGURE 1.

Figure 1:
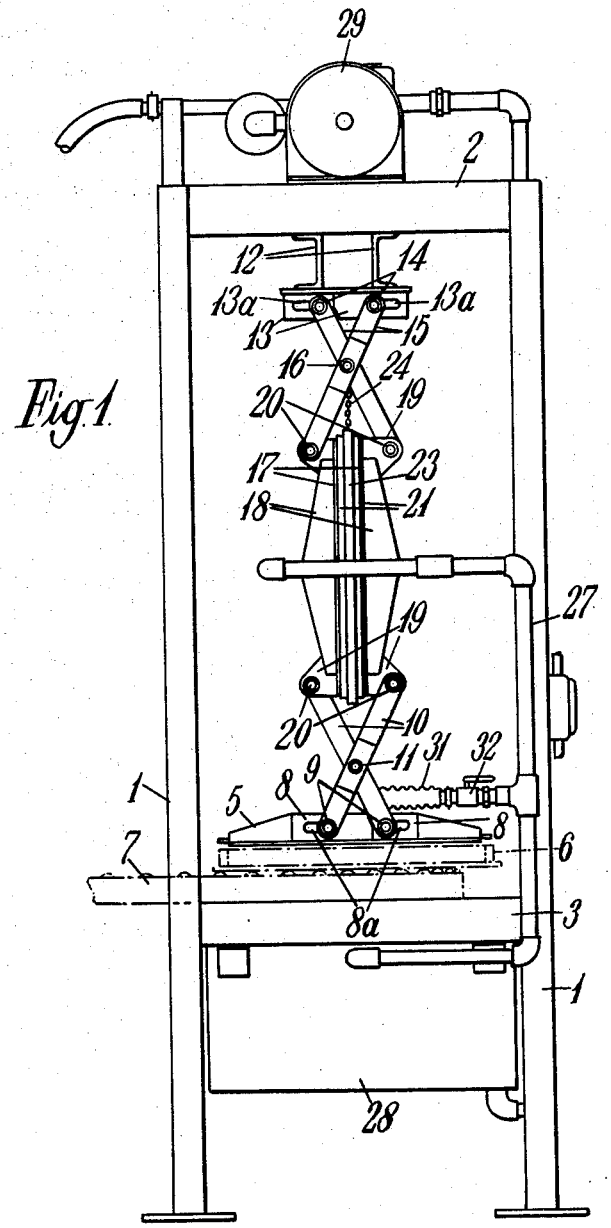
FIGURE 1 is a front elevation of a press suitable for the molding of concrete slabs, constructed in accordance with one form of the invention.

In carrying the invention into effect according to one convenient mode as applied by way of example to a press as illustrated in the figures for the molding of concrete slabs, there is provided a generally rectangular frame comprising four vertical uprights 1 connected by horizontal members 2 and 3. A base plate 4 is secured to the upper end of the frame. A pressure plate or pad 5 is suspended from the frame by a linkage arrangement and is adapted to enter the open top of a mold box 6, the latter resting upon a roller conveyor indicated at 7 which is supported by the cross members 3 of the frame. In the present example the pressure plate or pad 5 is of the so-called vacuum process type and comprises a shallow metal or other box the lower face of which is formed of a porous material preferably a perforated plate or wire gauze and provided with sealing means so that it can be applied to the concrete mix in the mold box to mold a slab by pressure and to withdraw water from the mix through a connection between the pressure plate or mat and a source of suction.

The frame or box of the pressure plate 5 carries two spaced pairs of brackets 8 formed with horizontal slots 8a in which rest two parallel cross shafts 9 (FIGURE 1). To each cross shaft 9 is pivoted a spaced pair of links 10 which extend upwardly and are crossed, these links being pivoted together at their crossing point by a horizontal pivot shaft 11 to form a vertically extensible linkage element.

The upper part of the frame is provided with horizontal cross beams 12 which support brackets 13 having horizontal slots 13a in which rest a pair of cross shafts 14 each carrying a pair of cross links 15 which are pivoted on a shaft 16 at their crossing points and form a vertically extensible linkage having the same characteristics as that described in connection with the pressure plate 5.

Between the aforesaid two linkage elements and forming a part of a complete extensible linkage are two metal or other pressure plates 17 constituting actuating means and disposed in vertical planes and spaced a short distance apart in horizontal alignment. These plates are reinforced by ribs indicated at 18. Pairs of brackets 19 secured to the outer side of each of the plates 17 respectively near the top and bottom edges thereof carry horizontal shafts 20. The lower ends of the crossed links 15 of the upper linkage element are respectively pivoted to the upper horizontal shafts 20 of the two plates 17, and the upper ends of the crossed links 10 of the lower linkage element are respectively pivoted to the lower horizontal shafts 20 of the said plates. Secured to the inner side of each of the plates 17 is an inwardly projecting and continuous marginal wall 21 of compressible and elastic vacuum sealing material, preferably a soft and compressible rubber or rubber-like material. Secured to the plate 17 within the marginal wall 21 are metal distance strips 22. A flat imperforate plate 23 is suspended between the plates 17 by means of chains 24 attached to the shaft 16 and is dimensioned to extend outwardly beyond the edges of the plates 17 as shown in FIGURES 1 and 2. The plate 23 may be formed from steel, plywood, composition board or other imperforate material. When the plates 17 are hanging freely from the linkage the marginal sealing walls will be held against the plate 23. Each of the plates 17 has a tubular connection 25 (FIGURE 4) in communication by a flexible hose 26 with a pipe 27 leading to a reservoir tank 28, which also serves as an air and water separator, from which a pipe 28a leads to an exhauster unit or vacuum pump 29 driven by a motor 30. The arrangement is such that on starting up the exhauster unit 29 the enclosed space between each of the plates 17 and the central plate 23 is evacuated and the plates 17 move together by compressing the marginal sealing walls 21 until the distance strips 22 engage the plate 23. This action extends the two linkage elements downwardly so that the pressure plate or pad 5 is displaced downwardly into the open mold box 6 providing the pressure required for molding a slab. Upon release of the vacuum, which may be effected by opening an atmospheric valve (not shown), the plates 17 separate under elastic expansion of the marginal wall 21 and the linkage contracts to raise the pressure plate 5 out of the mold box.

In the present example the hollow interior of the pressure plate 5 is connected by piping including a flexible hose portion 31 and a valve 32 to the suction pipe 27. In operating the press, a mold box 6 containing the required quantity of concrete mix is positioned vertically below the pressure plate 5 and the plates 17 are evacuated to apply the pressure plate 5 to the mold. The valve 32 in the suction line of the pressure plate 5 is opened for a sufficient period to extract the water from the concrete. Subsequently the atmospheric release valve is opened to discharge the vacuum in the plates 17, thereby releasing the mold which can be removed, after which the procedure may be repeated with a fresh mold.

Any desired arrangements may be provided for positioning and removing mold boxes in succession, and such may conveniently include a roller conveyor arrangement as indicated.

It is to be understood that the invention is not restricted to the above example but may be applied to the molding or forming of a wide variety of materials and to forming operations generally. Thus the materials to be molded or formed may include thermoplastic and resin bonded materials, or bitumen containing a fibrous or other filler. Also the invention is not restricted to the arrangement of vertical plates constituting actuating means for the displaceable pressure element. Thus the required displacement could be effected by means comprising or including a concertina or similar form of collapsible chamber. Such an arrangement would be advantageous where a relatively large displacement of the molding pressure element is required.

In the forming of corrugated sheets or channels from asbestos composition or other materials the pressure or forming plate may comprise a horizontal beam actuated by a series of press units as previously described, the number of units being such as to afford the desired forming pressure. The separate press units are relatively light and portable and are readily assembled at any desired site, thus obviating a large rigid machine.

The invention may also be employed for the molding of arcuate slabs such as tunnel lining sections for which purpose the press unit or units are preferably arranged to operate horizontally, for example outwardly from a central vertical support. A similar arangement may be employed for molding circular hollow articles such as pipe or conduit sections. Alternatively the press units may be arranged for the formation of bitumen or other linings in tunnels the units being disposed to act outwardly from a central horizontal support.

For some purposes it may be advantageous to employ a series of press units adjusted to apply different pressures to different parts of a single molded article, as for example when molding a long and relatively narrow article of varying cross-section, the molding pressure being varied to suit the section. With such arrangements it may be desirable to provide a mold constructed to afford a degree of flexibility.

It will also be understood that the invention may be applied to pressure molding or forming without the use of vacuum in the mold pressure plate or plates, and that details of the linkage and of the actuating chamber as described in the example may be widely varied.

I claim:

1. A press for molding or forming concrete or other plastic materials comprising a mold box, a perforated vertically displaceable pressure pad mounted opposite the mold box, a pair of actuating plates disposed in parallel spaced relation, compressible sealing means between the said plates, said plates and compressible sealing means defining a chamber, a pair of extensible linkage elements each comprising pivotally connected crossed links between which are pivotally connected said pair of actuating plates, a fixed support, an upper crossed link element suspended from said fixed support and a lower crossed link element pivotally connected to the displaceable pressure pad, and a source of suction connected to said chamber and to said perforated pressure pad for drawing said plates closer together by evacuation of the chamber, the movement of said plates extending said linkage and displacing the perforated pressure pad while simultaneously drawing off air or moisture from material in the mold box through the perforated pad.

2. A press for molding or forming concrete and other plastic materials comprising a mold box, a perforated pressure pad mounted for movement toward and away from said box, an actuating means arranged in spaced relationship to said pressure pad in a plane at right angles to said pressure pad, said actuating means including a pair of plates disposed in parallel spaced relation, compressible sealing means between said plates, said plates and compressible sealing means defining a chamber, an extensible pivoted linkage means connected between said plates and said perforated pressure pad, a fixed support located in spaced relationship to the side of the actuating means remote from said perforated pressure pad, extensible means pivotally connected between said fixed support and said plates, and a source of suction connected to said chamber and to said perforated pressure pad for drawing said plates closer together by evacuation of the chamber, the movement of said plates together extending said pivoted linkage means and said extensible means for moving the perforated pad toward said mold box while simultaneously drawing off air or moisture from material in the mold box through said perforated pad.

3. A press for molding or forming concrete and other plastic materials comprising a mold box, a perforated pressure pad mounted for movement toward and away from said box, an actuating means arranged in spaced relationship to said pressure pad in a plane at right angles to said pressure pad, said actuating means including a pair of plates disposed in parallel spaced relation, compressible sealing means between said plates, said plates and compressible sealing means defining a chamber, first pivotally connected crossed links pivotally connected to said plates and said pressure pad respectively, a fixed support located in spaced relationship to the side of the actuating means remote from said perforated pressure pad, second pivotally crossed links pivotally connected to said plates and fixed support respectively, and a source of suction connected to said chamber and to said perforated pressure pad for drawing said plates closer together by evacuation of the chamber, the movement of the plates together extending said first and second pivotally connected crossed links for moving the pressure pad toward the mold box while simultaneously drawing off air or moisture from the material in the mold box through the perforated pad.

4. The press as claimed in claim 3, wherein said actuating means is disposed in a substantially vertical plane.

5. The press as claimed in claim 3, including an imperforate plate located between the sealing means on said plates.

References Cited in the file of this patent

UNITED STATES PATENTS

| | | |
|---|---|---|
| 179,091 | Boomer | June 27, 1876 |
| 463,160 | Moore et al. | Nov. 17, 1891 |
| 2,026,940 | Hendryx | June 7, 1936 |
| 2,243,205 | Hall | May 27, 1941 |
| 2,586,143 | Clark et al. | Feb. 19, 1952 |